United States Patent
Chandrahasan et al.

(10) Patent No.: US 11,204,953 B2
(45) Date of Patent: Dec. 21, 2021

(54) GENERATION OF LINEAGE DATA SUBSET BASED UPON BUSINESS ROLE

(71) Applicant: International Business Machines Corporation, Armonk, NY (US)

(72) Inventors: Rajmohan Chandrahasan, Kanchipuram (IN); Himanshu Gupta, Vasant Kunj (IN); Sameep Mehta, Bangalore (IN); Bhanu Mudhireddy, Hyderabad (IN); Manish Anand Bhide, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 44 days.

(21) Appl. No.: 16/853,414

(22) Filed: Apr. 20, 2020

(65) Prior Publication Data

US 2021/0326366 A1   Oct. 21, 2021

(51) Int. Cl.
| | |
|---|---|
| G06F 7/00 | (2006.01) |
| G06F 16/335 | (2019.01) |
| G06F 16/36 | (2019.01) |
| G06Q 10/06 | (2012.01) |
| G06F 16/38 | (2019.01) |
| G06F 16/332 | (2019.01) |

(52) U.S. Cl.
CPC ........ *G06F 16/335* (2019.01); *G06F 16/3326* (2019.01); *G06F 16/3329* (2019.01); *G06F 16/367* (2019.01); *G06F 16/38* (2019.01); *G06Q 10/063* (2013.01)

(58) Field of Classification Search
CPC .... G06F 16/38; G06F 16/367; G06F 16/3326; G06F 16/3329; G06Q 10/063

USPC ................. 707/748, 754, 999.203
See application file for complete search history.

(56) References Cited

U.S. PATENT DOCUMENTS

| | | |
|---|---|---|
| 6,947,951 B1 | 9/2005 | Gill |
| 2009/0216731 A1* | 8/2009 | Markovic .............. G06Q 10/10 |
| 2011/0320460 A1* | 12/2011 | Fankhauser ............ G06Q 10/10 |
| | | 707/748 |

(Continued)

FOREIGN PATENT DOCUMENTS

| | | |
|---|---|---|
| CN | 107909145 A | 4/2018 |
| WO | WO2016130615 A1 | 8/2016 |

OTHER PUBLICATIONS

Francisco Guimaraes et al., "Enterprise Intelligence based on Ontology Metadata", 2015, 8 pages.

*Primary Examiner* — Md I Uddin
(74) *Attorney, Agent, or Firm* — Ference & Associates LLC (57) ABSTRACT

One embodiment provides a method, including: generating a plurality of ontologies wherein each ontology is generated by: monitoring interactions of a user with lineage information, wherein the monitoring comprises monitoring (i) filter interactions and (ii) access interactions; aggregating the monitored interactions of the user with monitored interactions of other users having a given business role; and generating an ontology for the given business role, wherein the subset comprises (i) event types, (ii) event constraints, (iii) event metadata, and (iv) event context; and upon a user having one of the plurality of business roles accessing lineage information on the data platform, providing a subset of the lineage information.

17 Claims, 3 Drawing Sheets

(56) References Cited

U.S. PATENT DOCUMENTS

| | | |
|---|---|---|
| 2015/0012478 A1 | 1/2015 | Mohammad et al. |
| 2016/0028580 A1 | 1/2016 | Radivojevic et al. |
| 2016/0300156 A1 | 10/2016 | Bowers et al. |
| 2018/0052878 A1 | 2/2018 | Seetharaman et al. |
| 2019/0164062 A1* | 5/2019 | Moura .............. G06F 16/90332 |
| 2020/0320130 A1* | 10/2020 | Korpman .............. G06F 16/244 |

* cited by examiner

GENERATION OF LINEAGE DATA SUBSET BASED UPON BUSINESS ROLE

BACKGROUND

Data are frequently being accessed and manipulated. In order to keep track of this, the system may generate lineage data that track and record the manipulations and accesses. The lineage data may then be accessed at a later time by a user to learn about the events that correspond to the data. Thus, lineage data enables a number of governance use-cases on a data or artificial-intelligence (AI) platform. Lineage data may also be used to answer queries related to the lifecycle of various assets that are present on the platform. Since lineage data record various events related to a data asset (e.g., transformations occurring on a data asset, movement of a data asset, how a data asset changes over time, etc.), the lineage data may become very large. Thus, when accessing or querying the lineage data of an asset, the results may return a large number of assets and events, as well as associated metadata.

BRIEF SUMMARY

In summary, one aspect of the invention provides a method, comprising: generating a plurality of ontologies, each ontology corresponding to one of a plurality of business roles of users, wherein each ontology is generated by: monitoring interactions of a user with lineage information of data assets hosted on a data platform, wherein the user has a given business role from the plurality of business roles, wherein the monitoring comprises monitoring (i) filter interactions that identify how the user filters the lineage information and (ii) access interactions that identify how the user manipulates views of the lineage information; aggregating the monitored interactions of the user with monitored interactions of other users having the given business role; and generating an ontology for the given business role, wherein the ontology identifies a subset of the lineage information that is of interest to the given business role as identified from the aggregated monitored interactions, wherein the subset comprises (i) events of interest to the given business role, (ii) constraints that reduce the lineage information, (iii) event metadata of interest, and (iv) event context identifying other lineage events that provide context for the events; and upon a user having one of the plurality of business roles accessing lineage information on the data platform, providing, by applying an ontology corresponding to the one of the plurality of business roles to the lineage information, a subset of the lineage information.

Another aspect of the invention provides an apparatus, comprising: at least one processor; and a computer readable storage medium having computer readable program code embodied therewith and executable by the at least one processor, the computer readable program code comprising: computer readable program code configured to generate a plurality of ontologies, each ontology corresponding to one of a plurality of business roles of users, wherein each ontology is generated by: monitoring interactions of a user with lineage information of data assets hosted on a data platform, wherein the user has a given business role from the plurality of business roles, wherein the monitoring comprises monitoring (i) filter interactions that identify how the user filters the lineage information and (ii) access interactions that identify how the user manipulates views of the lineage information; aggregating the monitored interactions of the user with monitored interactions of other users having the given business role; and generating an ontology for the given business role, wherein the ontology identifies a subset of the lineage information that is of interest to the given business role as identified from the aggregated monitored interactions, wherein the subset comprises (i) events of interest to the given business role, (ii) constraints that reduce the lineage information, (iii) event metadata of interest, and (iv) event context identifying other lineage events that provide context for the events; and computer readable program code configured to, upon a user having one of the plurality of business roles accessing lineage information on the data platform, provide, by applying an ontology corresponding to the one of the plurality of business roles to the lineage information, a subset of the lineage information.

An additional aspect of the invention provides a computer program product, comprising: a computer readable storage medium having computer readable program code embodied therewith, the computer readable program code executable by a processor and comprising: computer readable program code configured to generate a plurality of ontologies, each ontology corresponding to one of a plurality of business roles of users, wherein each ontology is generated by: monitoring interactions of a user with lineage information of data assets hosted on a data platform, wherein the user has a given business role from the plurality of business roles, wherein the monitoring comprises monitoring (i) filter interactions that identify how the user filters the lineage information and (ii) access interactions that identify how the user manipulates views of the lineage information; aggregating the monitored interactions of the user with monitored interactions of other users having the given business role; and generating an ontology for the given business role, wherein the ontology identifies a subset of the lineage information that is of interest to the given business role as identified from the aggregated monitored interactions, wherein the subset comprises (i) events of interest to the given business role, (ii) constraints that reduce the lineage information, (iii) event metadata of interest, and (iv) event context identifying other lineage events that provide context for the events; and computer readable program code configured to, upon a user having one of the plurality of business roles accessing lineage information on the data platform, provide, by applying an ontology corresponding to the one of the plurality of business roles to the lineage information, a subset of the lineage information.

A further aspect of the invention provides a method, comprising: identifying a business role of a user accessing lineage data for one of a plurality of data assets hosted on a data platform; and providing a subset of the lineage data, the subset being created by utilizing a previously defined ontology corresponding to the business role that reduces the lineage data into the subset, wherein the previously defined ontology is defined by: monitoring historical interactions of users with lineage data of data assets hosted on the data platform, wherein each of the monitored users has a corresponding business role, wherein the monitoring comprises monitoring (i) filtering of the lineage data by a given user and (ii) manipulating views of the lineage data by the given user; and defining, from the monitored historical interactions of users having the business role, an ontology for the business role, wherein the ontology filters the lineage data into a lineage data subset that is of interest to the business role, wherein the lineage data subset comprises (i) events of interest to the given business role, (ii) event constraints that identify filters on the events, (iii) event metadata of interest corresponding to the events, and (iv) event context identifying other lineage data that provide context for the events.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

In order to keep track of all of the events on a data asset (e.g., addition of information to a data asset, curation of data assets, training of a model, feedback received, etc.), a data platform provides a lineage service which tracks and records these events. The lineage data support a number of data and artificial-intelligence governance use-cases, for example, data quality, compliance, audit, and the like. The ability to support these use cases makes lineage data important. An entity can access the lineage data or history to determine what events have occurred with respect to a data asset. The lineage history includes technical lineage data which consists of very fine-grained details regarding the data assets, including, every event, transformation, workflow, data-movement, metadata change, and the like. Thus, the lineage information becomes very large and complex very quickly. Parsing such a large lineage output is tedious for most business users.

Additionally, while all of this information may be helpful to some users, other users accessing the lineage information are not interested in all of these data. Rather, some users are only interested in lineage information that pertains to the role of the user. For example, a data scientist user may be interested in all the technical lineage information, whereas an information technology user may only be interested in the lineage information that is related to issues and the information technology infrastructure. For those users who only want a subset of the lineage information, sifting through or scanning the entire set of lineage information is tedious and results in missed information.

Conventional systems allow users to filter lineage information. When the user accesses the lineage information, the user can select constraints on different information parameters. For example, the user may select a date and time range which causes the system to display only the lineage information included in the selected date and time range. As another example, the user may select information related to a single data asset which causes the system to display only the lineage information associated with the selected data asset. The conventional systems may also present the lineage information within collapsible hierarchical views or other data storage organization formats. By presenting the lineage information in a data storage organization format, the display is not as cluttered for a user. When a user finds data of interest, the user can select the data and expand the data storage structure associated with that data.

While the filtering and organization of the lineage information are helpful for reducing the lineage information presented at a single time, the user has to perform the filtering or selection of data of interest every time the user accesses the lineage information. Additionally, each user individually has to perform display manipulations. In other words, each user who would be interested in the same lineage information has to perform display manipulations. There is no current technique that allows for display manipulations to be stored for each individual user, or across users who may be interested in the same lineage information, for example, those users with similar business roles.

Accordingly, an embodiment provides a system and method for generating a lineage data subset for a particular business role using a business role ontology that is generated from historical interactions of users with lineage data of data assets. The system generates business role ontologies, with each of the business role ontologies corresponding to a particular business role, for example, a data scientist role, a human resources role, a data quality analyst role, an information technology role, and the like. To generate each of the business role ontologies, the system monitors interactions of users with lineage information of data assets hosted on a data platform. The system also identifies the business role of the monitored user. The monitoring includes monitoring filter interactions which identify how a user filters or constrains the lineage information. The monitoring also includes monitoring access interactions which identify how the user manipulates views of the lineage information, for example, events within the lineage information that the user expands, the metadata that the user views, and the like. The system can also monitor other types of interactions that a user may have with the lineage information.

For a particular business role, the system aggregates the monitored interactions of the users having that business role. The aggregated interactions provide the system with insight into the lineage information that is of interest to a user with the business role. In other words, the system can correlate the interactions of the monitored users with lineage information to identify what information a user having a particular business role views and, therefore, what lineage information is of interest to that business role. From the aggregated interactions, the system can generate an ontology for the business role. The ontology identifies a subset of the lineage information that is of interest to a user having a business role. For example, the subset may identify events that are of interest to the business role, event constraints that are used to filter the events, event metadata that are of interest to the business role, event context that provide context for the events, and the like. Thus, when a user having a particular business role access lineage information on the data platform, the ontology that is specific to the business role can be used to provide a subset of the lineage information that is of interest to the user based upon the business role of the user.

Such a system provides a technical improvement over current systems for presentation of lineage information. The system generates business role ontologies by monitoring interactions of users with lineage information on a data platform. The interactions of users provide insight regarding the type of lineage information that the user is interested in. By correlating the interactions with the business role of the user performing the interactions, the system can identify the type of lineage information that is of interest to a particular business role. Using the business role ontologies, the system can provide lineage information that is specific to a business role of a user when the user accesses lineage information on the data platform. Thus, the described system and method provide a technique for generating a business ontology from historical user interactions. The business ontology can then be used in presenting lineage information that is specific to a business role of a user instead of all the lineage information for a data asset, thereby making it easier for the user to analyze and process the lineage information. Accordingly, the described system and method provide lineage information in a more effective and directed manner than conventional techniques, thereby reducing the time it takes for a user to obtain the desired lineage information.

Figure 1:
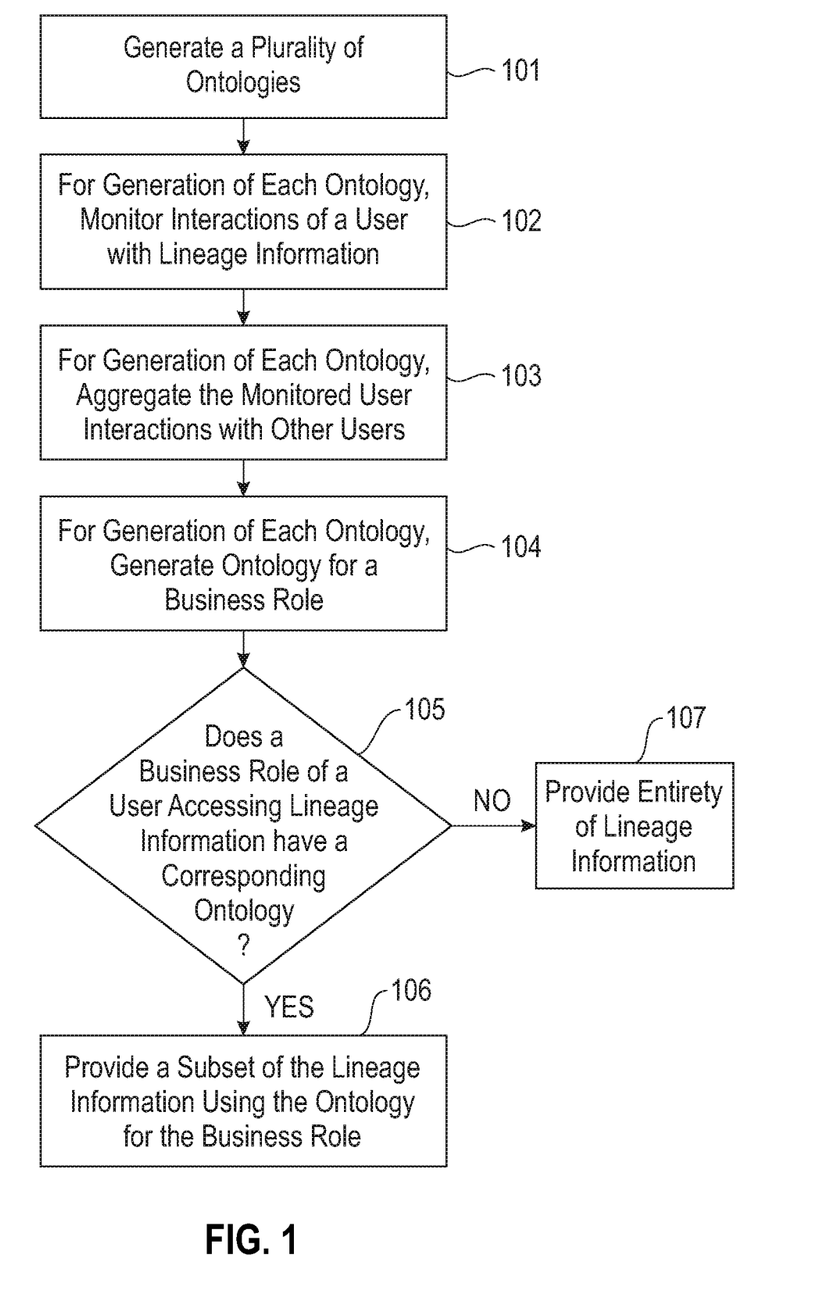
FIG. 1 illustrates a method of generating a lineage data subset for a particular business role using a business role ontology that is generated from historical interactions of users with lineage data of data assets.

FIG. 1 illustrates a method for generating an ontology for a particular business role from historical interactions of users with lineage data of data assets and then using the business ontology to present a lineage data subset to the users having the business role. Lineage information or data is information that identifies manipulations and events that occur on a data asset (e.g., machine-learning model, training dataset, artificial intelligence model, dataset, etc.) that is hosted on a data platform (e.g., cloud computing environment, network computing environment, remote computing environment, etc.). For example, the lineage information may include information related to events (e.g., accessing a data asset, saving a data asset, training a data asset, refining a data asset, feedback related to a data asset, how data is curated, etc.), event metadata (e.g., timestamps, hyperparameters, schemas, etc.), and the like.

At 101 the system generates or defines a plurality of ontologies. Each of the ontologies is generated in view of a specific business role of users that may access lineage data, for example, an information technology role, data scientist role, engineer role, quality assurance role, human resources role, or any other role that a user may have within an entity. Thus, each of the ontologies is a business role ontology that includes information unique to a particular business role. While each of the business role ontologies contains information that is unique to a particular business role, the technique for generating each of the ontologies is the same.

To generate or define each of the business role ontologies, the system monitors interactions of a user with lineage information of data assets hosted on the data platform at 102. When the user accesses the data platform, the system can identify a business role of the user. To identify the business role, the system may access a user profile, the user may provide identification of the business role, or the like. For example, when a user accesses a data platform, the system may provide user credentials. From the user credentials, the system can access a profile associated with that user. The user profile may identify a business role of the user. Alternatively, the user profile may identify a department or group that the user works within. From the identified department or group, the system may associate a business role with the user. If the user does not have a profile, or the profile does not have a defined business role, the system may access a secondary source to identify the business role. For example, the system may access an organization chart or other entity documentation to identify a department or group that the user works within. This department or group may then allow the system to identify a business role of the user. If the system cannot determine a business role of the user utilizing other techniques, the system may request that the user provide information identifying the business role of the user.

Additionally, when the user accesses the data platform, the system can track or monitor the interactions of the user with the data platform and, therefore, data assets on the data platform. To monitor interactions, the system may record user selections, user keystrokes, and the like, to identify what the user is selecting and how the user is interacting with the lineage information. In other words, the system can record the set of events that correspond to the user click patterns, keystrokes, and other user interactions, and correlate these events with the lineage information that is presented as a result of the event.

Interactions that a user may perform with the lineage information may include filter interactions and access interactions. Filter interactions are those interactions that the user performs to reduce the amount of lineage information, for example, placing constraints on lineage information parameters (e.g., dates, event types, a data asset, etc.), placing constraints on views of lineage information, filtering based upon a condition of an event property (e.g., accuracy falling below a predetermined threshold, a time constraint placed around a particular event, etc.), and the like. For example, a quality assurance user may filter information regarding a particular event type, for example, machine-learning model training, and a particular accuracy, for example, when the model accuracy falls below 70%. The user may further be interested in the events that occurred within a particular time frame, for example, 5 minutes, before the accuracy fell below the 70% threshold. All of these are filters that the quality assurance user may place on the lineage information to then view the desired lineage information.

Access interactions are those interactions that the user performs to view different portions of the lineage data. In other words, the access interactions are those interactions where the user is manipulating the views of the lineage data. An example of an access interaction is a user selecting metadata associated with an event in the lineage information. For example, the user may select a machine-learning model training event and then further select metadata corresponding to that event, for example, time information, the dataset used to train the model, creator of the dataset used to train the model, and the like. Another example of an access interaction is a user selecting a link within the lineage information, for example, a link to another data asset, links within the metadata, and the like. A further example of an access interaction is a user expanding or minimizing views or branches within the lineage information, for example, branches within metadata, branches of particular data assets, branches of particular events, or the like.

The system can also use the filter and access interactions to identify event context that is of interest to the user. In other words, the system can mine the filter and access interactions to identify those events or context that are of interest to the user. For example, a user may select an event of interest and then apply filters and manipulate the lineage information views to view a particular time frame and particular events that occur around the selected event. Thus, using the filter and access interactions, the system can identify that the user is interested in a particular context of that event, including a particular time frame and particular events that occur around that event.

Using the mined filter and access interactions, the system can identify a correlation between an event and the information that the user is accessing, thereby identifying a context of the event. The context of an event, for example, the events and metadata around a particular event of interest, may identify why an event occurred, the events leading up to the event, the response of the data asset to an event, and the like. Accordingly, the context includes those events and corresponding metadata that may be of interest to a user because the user is interested in a particular event or metadata, and the surrounding events and/or metadata may provide additional information regarding the particular event or metadata.

At 103 the system aggregates the monitored user interactions with monitored interactions of other users. Since each of the ontologies is for a particular business role, the interaction information that is aggregated is interaction information for users having the same or similar business role. In other words, the system aggregates the interactions of the users having the same business role. Thus, the system will have groups of user interactions, with each group corresponding to a different business role. Determining whether user interaction information should be aggregated into a single group may be based upon a similarity of business role labels. For example, one system may aggregate the monitored user interactions of users having the same exact business role, whereas another system may aggregate the monitored user interactions of users having similar business roles. Thus, the system utilizes a type of crowdsourcing technique to identify the lineage information that is of interest to a particular business role by monitoring and aggregating interactions of users having the business role.

A determination of similarity of business roles across users may be performed utilizing one or more similarity techniques, for example, similarity measures, clustering techniques, affinity measurements, class distribution measures, and the like. A similarity within a threshold may result in the system grouping the user interactions, whereas a similarity outside the threshold may result in the system not grouping the user interactions. The threshold may be a default threshold or may be set by a user. Additionally, the threshold may be different for business roles. For example, one business role may have one threshold value, whereas another business role has a different threshold value.

From the aggregated user interactions of users having a business role corresponding to the ontology being generated, the system generates a business role ontology at 104. Since a business role ontology is generated for each business role, the system will generate many business role ontologies. Using the aggregated interaction information, the system can define an ontology for the business role that identifies the type of lineage information that is of interest or pertinent to a particular business role. The ontology identifies a subset of the lineage information that is of interest to a user with a particular business role. The ontology specifies events of interest, event metadata of interest, event constraints that are used to filter or restrict the events or event metadata, and event context that identifies other lineage events or metadata that provide context for the events of interest.

Both the filter and access interactions provide insight into what events or event types are of interest to a particular business role. Since the events or event types correspond to events with respect to a data asset (e.g., training a model, curating information for a data set, accessing a model, etc.), the event information can be identified from the events that a user chooses to interact with. For example, a user having a quality assurance business role may only look at events that are associated with quality parameters (e.g., accuracy, robustness, number of accesses, length of jobs, etc.) and may be uninterested in other events, thereby allowing the system to identify those events of interest to the quality assurance business role. Since a user may manipulate views of the lineage information to view information regarding a specific event, the access interactions may provide insight regarding the events of interest. Additionally, a user may provide constraints or filters on the lineage information in order to reduce the lineage information to a particular event. Thus, the filter interactions also provide insight regarding the events of interest. Similarly, both the filter and access interactions can provide insight into the metadata that is of interest to a particular business role.

The filter interactions may provide insight into the event constraints that should be included for a particular business role. Since the filter interactions identify the filters and constraints that the user places on the lineage information in order to reduce the amount of lineage information that is displayed, the filter interactions can be used to identify the constraints that should be included in the business role ontology. Although not as direct, the access interactions may also provide information regarding the event constraints. Rather than specifically identifying constraints from the interactions, as can be performed using the filter interactions, the system may identify different ways in which the user manipulates the views of the lineage information. The system may then determine whether constraints or filters could be applied that would result in the same type of information being presented to the user. In this manner, the system can utilize the access interaction information to identify event constraints to include in the business role ontology.

The system may use the access interactions to identify event context. The event context includes other lineage events or metadata that provide context for a particular event of interest. For example, if the user is viewing an event corresponding to a machine-learning model accuracy falling below a particular threshold, the user may be interested in the events and/or metadata leading up to the event as these events and/or metadata may provide insight into why the model accuracy fell below the threshold. To view these events, the user generally manipulates the views within the lineage information. Thus, these access interactions can provide insight into what events and/or metadata should be included with a particular event type to provide context for that event. Filter interactions can also provide insight regarding the event context. Using the above example, the user may provide a filter constraining the amount of time before the event of interest to understand what events occurred in this time period. Thus, the filter interactions may also be used in identifying the event context within the ontology.

The identified events and event context may be utilized to generate a business event to be included in the lineage output presented using the ontology. A business event may be an event that is an aggregation of events into a single event that is of interest to a business role. To create a business event, the system may recognize that a series of events occurring within the lineage information is of interest to a user and is used for identifying a particular business event. For example, a user may be interested in redeployments of models and the reason for the redeployment. However, the user does not necessarily need to see all of the events that lead to the redeployment and, instead, is only concerned with the fact that the model was redeployed and the reason for the redeployment. Accordingly, the system may recognize that the redeployment event is of interest to the user. Additionally, the user is interested in the context surrounding that event in order to identify the cause of the redeployment. Accordingly, the system can aggregate all of the lineage events leading up to and including the redeployment into a single business event that identifies the model was redeployed and the reason why it was redeployed. Different business roles may have different policies or rules for clustering events into a business event. For example, for some business roles no business events are created, whereas for other business roles many business events are created.

Additionally, the system may convert event metadata to a natural language phrase which describes the business information associated with an event. The system identifies an event of interest and metadata corresponding to that event. The system then utilizes a natural language template to convert the metadata to a natural language phrase or sentence. A natural language template may be defined for each event type and may include a structure with blank regions that are filled in based upon the metadata. For example, for an event corresponding to bias detection, the template may be "______ bias detected against ______," where each of the blanks is filled in based upon the metadata associated with the bias detection event. Not only is the template different for different events, but it can also be different for different business roles. In other words, for the same event across business roles, the template may be different.

In generating the ontology, the system can also utilize user feedback to identify information that should be included in the ontology. For example, once the ontology is generated, the ontology may be presented to a user who may further refine the ontology, for example, by adding or deleting information from the ontology. As another example, a user may specifically identify that particular events, constraints, metadata, or context should be included in the ontology during interactions of the user with lineage information. As another example, once the ontology is implemented and business role lineage information is being presented to a user, the user may access other lineage information that was not included in the lineage information presented in view of the ontology. This additional access or filter interaction may then be utilized by the system to refine the ontology.

Once all the ontologies for the business roles are generated, the system can utilize them for users accessing lineage information on the data platform. Thus, when a user accesses the lineage information on the data platform, the system may identify a business role of the user. Based upon the business role of the user, the system may determine whether an ontology has been generated or defined for that business role at 105. Making the determination of whether an ontology exists for a business role may be performed by accessing a database or other data storage location that stores the ontologies and determining if a business role ontology matching the identified business role exists. The system may also utilize similarity techniques to determine if the identified business role is similar to a business role that has an ontology.

If a business role ontology for the identified business role does not exist, the system may provide the entirety of the lineage information at 107, as with traditional techniques. Alternatively, the system can try to identify a business role ontology that is similar to the identified business role and utilize that business role ontology as a starting point and then accept user feedback to refine the ontology for the identified business role. If, on the other hand, a business role ontology for the identified business role exists, the system may provide a subset of the lineage information by applying the corresponding business role ontology to the lineage information at 106. In other words, upon a user having a business role accessing lineage information on the data platform, the system applies the business role ontology to the lineage information so that the user is presented with the lineage information that is of interest or pertinent to the user based upon the business role of the user.

Some business roles may result in the entirety of the lineage information being presented to the user even though the business role ontology is applied to the lineage information. For example, for some business roles, the entirety of the lineage information may be pertinent, so the system presents the entirety of the lineage information. In other words, the subset returned by applying the business role ontology may actually be the entirety of the lineage information. However, even in this scenario, the ontology may cause the lineage information to be presented in a different manner than the standard lineage information. For example, the system may provide business events in addition to the lineage information. As another example, the system may provide a particular view first or may rearrange the lineage information based upon the information most frequently accessed by the business role. Rearrangement of the lineage information may also occur for other business roles where a smaller subset of the lineage information is provided based upon the business role ontology.

Figure 2:
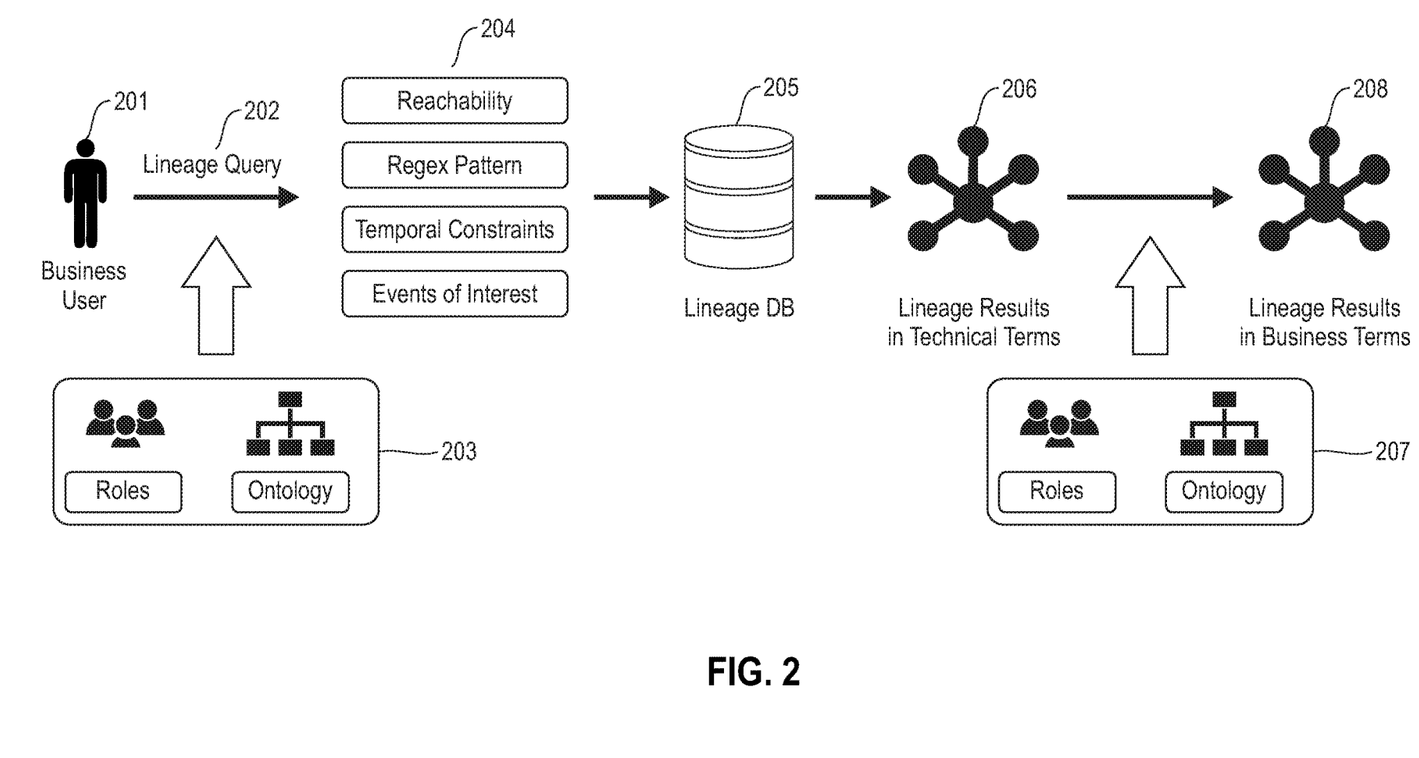
FIG. 2 illustrates an example system architecture for generating a lineage data subset for a particular business role using a business ontology which is based upon historical interactions of users with lineage data of data assets.

FIG. 2 illustrates an example overall system architecture for generating a lineage data subset for a particular business role using a business role ontology that is generated from historical interactions of users with lineage data of data assets. The system receives a lineage query 202 from a user 201. The lineage query 202 may refer to a request to present lineage information, for example, accessing a data asset, accessing the lineage information, or the like, or may refer to a query or question presented to the system where the system would return a response. The system takes into account the role of the user and an ontology related to that role 203 when executing the lineage query 202. In an optional step, the system may apply optimization algorithms or techniques, for example, reachability constraints, Regex (regular expression) patterns, temporal constraints, events of interest filters, and the like, 204, on the query. This step is not a necessary step, but may optionally provide an optimization for executing the query.

The result from the lineage database 205 is the lineage results in technical terms 206. However, these lineage results have been reduced to the lineage results that are relevant to the business role. It should be understood that for some business roles, the results may actually be the entirety of the lineage information because the entirety is of interest to a particular business role, for example, a data scientist role. The system can then further refine the lineage information results utilizing the business role ontology 207 on the lineage results in technical terms 206. This refinement results in the lineage results in business terms 208, as applicable, based upon the business role ontology 207. Some business roles may have ontologies where the information is not changed from the technical terms, so the conversion to the business terms may only occur for some business roles. Whether the information is converted to the business terms will be identified within the business role ontology.

Thus, the described systems and methods represent a technical improvement over current systems for presentation of lineage information. Instead of displaying all of the technical lineage information, the system utilizes an ontology that is generated for a particular business role to reduce the lineage information into business role lineage information. In other words, the lineage information presented to a user having a particular business role is the lineage information that is of interest to that business role, instead of all the lineage information. Thus, the described system and method provide a technique for reducing the amount of lineage information to a user, thereby reducing the amount of time that a user spends accessing and analyzing the lineage information for a data asset. Additionally, since the ontologies are generated for a particular business role, any user with that business role is presented with the information of interest to that business role. Thus, instead of every user having to filter and manipulate the lineage information, the lineage information is already filtered and manipulated for that business role. Accordingly, the described system and method provide a technique for presenting lineage information in a more efficient and directed manner than the traditional systems and techniques.

Figure 3:
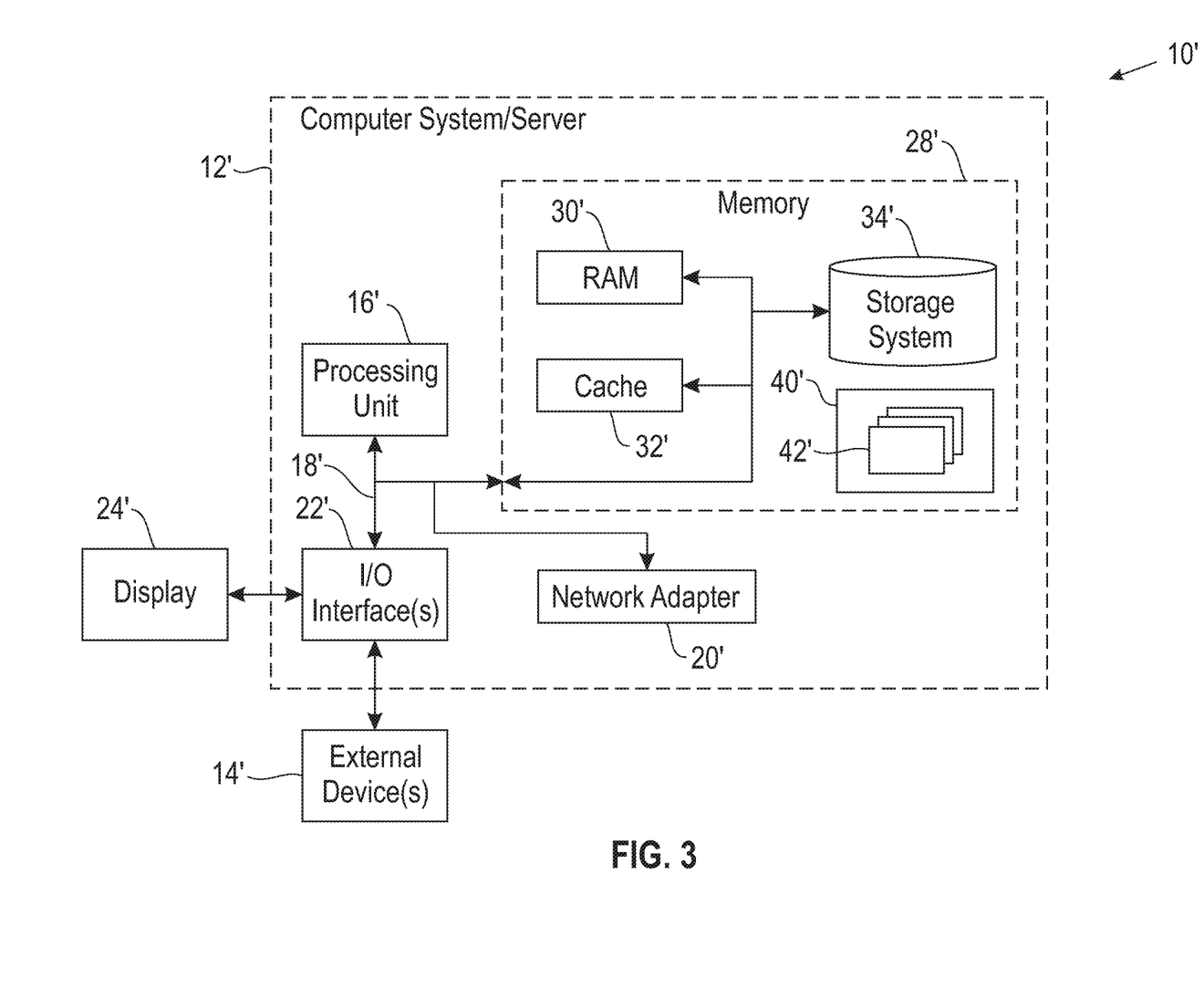
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/ server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   generating a plurality of ontologies, each ontology corresponding to one of a plurality of business roles of users, wherein each ontology is generated by:
   monitoring interactions of a user with lineage information of data assets hosted on a data platform, wherein the user has a given business role from the plurality of business roles, wherein the monitoring comprises monitoring (i) filter interactions that identify how the user filters the lineage information and (ii) access interactions that identify how the user manipulates views of the lineage information;
   aggregating the monitored interactions of the user with monitored interactions of other users having the given business role; and
   generating an ontology for the given business role, wherein the ontology identifies a subset of the lineage information that is of interest to the given business role as identified from the aggregated monitored interactions, wherein the subset comprises (i) events of interest to the given business role, (ii) constraints that reduce the lineage information, (iii) event metadata of interest, and (iv) event context identifying other lineage events that provide context for the events, wherein the event metadata within the ontology for a given business role comprise natural language event metadata, wherein the natural language event metadata are created by (i) accessing lineage metadata corresponding to an event of interest and (ii) converting, utilizing one of a plurality of natural language templates, the lineage metadata corresponding to an event of interest into a natural language phrase; and
   upon a user having one of the plurality of business roles accessing lineage information on the data platform, providing, by applying an ontology corresponding to the one of the plurality of business roles to the lineage information, a subset of the lineage information.

2. The method of claim 1, wherein each ontology is generated by receiving user feedback identifying information to be included in the ontology for the given business role.

3. The method of claim 1, wherein at least one of the access interactions comprises the user expanding a view within the lineage information.

4. The method of claim 1, wherein at least one of the access interactions comprises the user selecting a link within the lineage information.

5. The method of claim 1, wherein at least one of the filter interactions comprises the user selecting a condition to be assigned to an attribute of an event within the lineage information.

6. The method of claim 1, wherein at least one of the events within the ontology for a given business role comprises a business event, the business event being created by clustering, utilizing a policy, a plurality of events within the lineage information into the business event.

7. The method of claim 1, comprising identifying the business role of the user by accessing a secondary source comprising business roles of users.

8. The method of claim 1, wherein the providing comprises providing event context with the subset of the lineage information.

9. The method of claim 1, wherein the data asset comprises an asset selected from the group consisting of: a machine-learning model, an artificial intelligence model, a model training dataset, and a dataset.

10. An apparatus, comprising:
    at least one processor; and
    a computer readable storage medium having computer readable program code embodied therewith and executable by the at least one processor, the computer readable program code comprising:
    computer readable program code configured to generate a plurality of ontologies, each ontology corresponding to one of a plurality of business roles of users, wherein each ontology is generated by:
    monitoring interactions of a user with lineage information of data assets hosted on a data platform, wherein the user has a given business role from the plurality of business roles, wherein the monitoring comprises monitoring (i) filter interactions that identify how the user filters the lineage information and (ii) access interactions that identify how the user manipulates views of the lineage information;
    aggregating the monitored interactions of the user with monitored interactions of other users having the given business role; and
    generating an ontology for the given business role, wherein the ontology identifies a subset of the lineage information that is of interest to the given business role as identified from the aggregated monitored interactions, wherein the subset comprises (i) events of interest to the given business role, (ii) constraints that reduce the lineage information, (iii) event metadata of interest, and (iv) event context identifying other lineage events that provide context for the events, wherein the event metadata within the ontology for a given business role comprise natural language event metadata, wherein the natural language event metadata are created by (i) accessing lineage metadata corresponding to an event of interest and (ii) converting, utilizing one of a plurality of natural language templates, the lineage metadata corresponding to an event of interest into a natural language phrase; and
    computer readable program code configured to, upon a user having one of the plurality of business roles accessing lineage information on the data platform, provide, by applying an ontology corresponding to the one of the plurality of business roles to the lineage information, a subset of the lineage information.

11. A computer program product, comprising:
a computer readable storage medium having computer readable program code embodied therewith, the computer readable program code executable by a processor and comprising:
computer readable program code configured to generate a plurality of ontologies, each ontology corresponding to one of a plurality of business roles of users, wherein each ontology is generated by:
monitoring interactions of a user with lineage information of data assets hosted on a data platform, wherein the user has a given business role from the plurality of business roles, wherein the monitoring comprises monitoring (i) filter interactions that identify how the user filters the lineage information and (ii) access interactions that identify how the user manipulates views of the lineage information;
aggregating the monitored interactions of the user with monitored interactions of other users having the given business role; and
generating an ontology for the given business role, wherein the ontology identifies a subset of the lineage information that is of interest to the given business role as identified from the aggregated monitored interactions, wherein the subset comprises (i) events of interest to the given business role, (ii) constraints that reduce the lineage information, (iii) event metadata of interest, and (iv) event context identifying other lineage events that provide context for the events, wherein the event metadata within the ontology for a given business role comprise natural language event metadata, wherein the natural language event metadata are created by (i) accessing lineage metadata corresponding to an event of interest and (ii) converting, utilizing one of a plurality of natural language templates, the lineage metadata corresponding to an event of interest into a natural language phrase; and
computer readable program code configured to, upon a user having one of the plurality of business roles accessing lineage information on the data platform, provide, by applying an ontology corresponding to the one of the plurality of business roles to the lineage information, a subset of the lineage information.

12. The computer program product of claim 11, wherein each ontology is generated by receiving user feedback identifying information to be included in the ontology for the given business role.

13. The computer program product of claim 11, wherein at least one of the access interactions comprises the user expanding a view within the lineage information.

14. The computer program product of claim 11, wherein at least one of the access interactions comprises the user selecting a link within the lineage information.

15. The computer program product of claim 11, wherein at least one of the filter interactions comprises the user selecting a condition to be assigned to an attribute of an event within the lineage information.

16. The computer program product of claim 11, wherein at least one of the events within the ontology for a given business role comprises a business event, the business event being created by clustering, utilizing a policy, a plurality of events within the lineage information into the business event.

17. The computer program product of claim 11, wherein the providing comprises providing event context with the subset of the lineage information.

* * * * *